Nov. 30, 1965         A. T. CAPE         3,220,652
POWDER MELTING TORCH
Filed Aug. 29, 1963

INVENTOR.
ARTHUR T. CAPE
BY *Isler & Ornstein*
ATTORNEYS

United States Patent Office 3,220,652
Patented Nov. 30, 1965

3,220,652
POWDER MELTING TORCH
Arthur T. Cape, Monterey, Calif., assignor to Powder Melting Corporation, Monterey, Calif., a corporation of California
Filed Aug. 29, 1963, Ser. No. 305,433
2 Claims. (Cl. 239—85)

This invention relates generally to powder melting torches, but has reference more particularly to improvements in the torch disclosed in my copending application, Serial No. 301,822, filed Aug. 13, 1963, now Patent No. 3,194,501.

In my aforesaid patent application, there is disclosed a torch in which powder flows, by gravity, from a hopper through a resilient tube and into a chamber of the torch through which a combustible mixture of fuel gas and oxygen flows, the combustible mixture providing an aspirator action for assisting the gravity flow. A plunger is provided for shutting off the flow of powder by a pinching of the resilient tube, this pinching action occurring automatically upon release of a handle mounted on the torch.

I have found that the operation of such a torch is greatly improved if the plunger is located as closely as possible to the chamber in the torch, that is to say, near the lower end of the resilient tube, so that when the plunger pinches the tube to shut off the flow of powder, as little powder as possible is left between the shut-off point and chamber in the torch, since such excess powder will not be properly melted and is apt to form undesirable lumps on the coating formed by the powder.

I have also found that the flow of powder can be regulated in a desired manner, by an experienced welder, by merely manipulating the handle to produce any desired flow, and without the necessity of providing an adjustable screw for this purpose, as disclosed in the aforesaid application.

I have further found that it is desirable that the resilient tube, in the area of the shut-off, be opened fully and automatically, upon release of the handle. The reason for this is to prevent the material of the resilient tube from setting, in the area of the shut-off, during a period when the torch is not in use. The tube would recover its original cylindrical form at this point, if sufficient time were permitted for such recovery, but if sufficient time is not permitted for this purpose, and the use of the torch is resumed, as after an overnight period, the welder would not obtain the same flow through the tube upon such resumption of use.

The present invention has as its primary object the provision of a torch of the character described, in which all of the aforesaid improvements have been incorporated.

Other objects and advantages of my invention will be apparent during the course of the following description.

In the accompanying drawing forming part of this specification, and in which like numerals are employed to designate like parts throughout the same.

Figure 1:
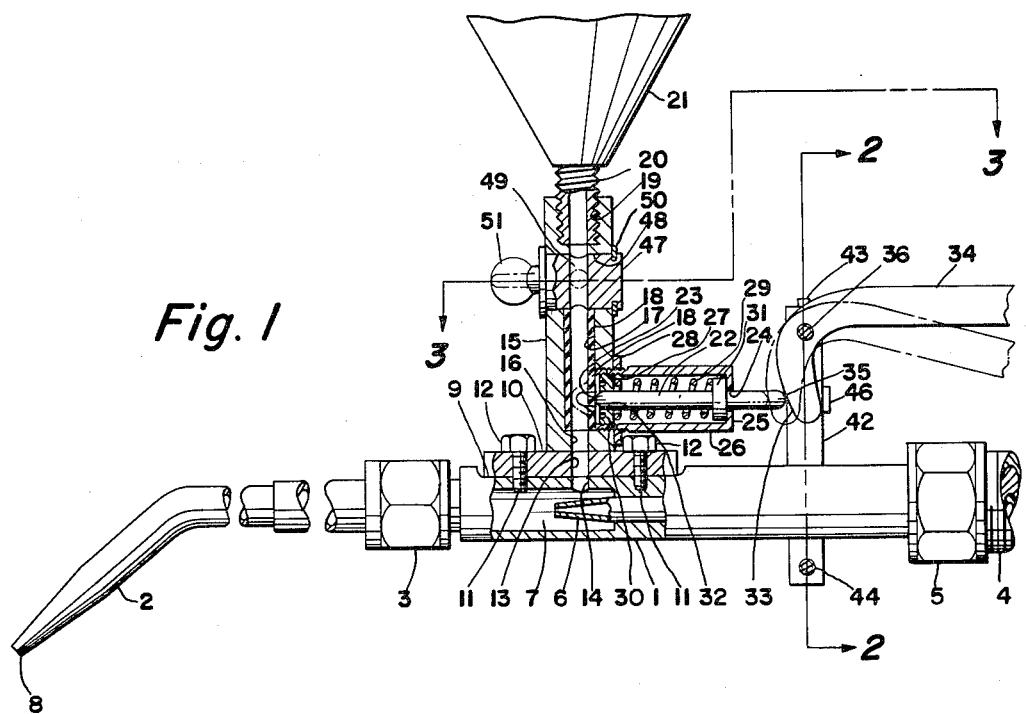
FIG. 1 is a view, partly in elevation, and partly in section, showing a torch embodying the novel features of the invention.

Referring more particularly to the drawings, there is disclosed a torch having a body 1, to the forward end of which a nozzle 2 is secured, as by a coupling nut 3. A torch butt (not shown) is secured to the torch body 1 by an adapter or coupling 4 and a nut 5. The butt is provided, adjacent its rear end, with knobs (not shown) which operate oxygen and fuel gas valves, for controlling the flow of such oxygen and fuel gas through the torch in accordance with conventional torch design.

The combustible mixture of oxygen and fuel gas is carried into the torch body by means of a nozzle 6, which discharges the combustible mixture into a chamber 7 in the body 1, the mixture flowing from this chamber into the nozzle 2, to provide a powder melting flame at the tip 8 of the nozzle.

The body 1 is provided with a flat surface 9, to which a base plate 10 is secured, as by studs 11 and nuts 12.

The base plate 10 is provided with a vertical opening 13, which communicates, at its lower end, with an opening 14 through which powder is dropped into the chamber 7 of the torch body.

The base plate 10 has brazed to its upper surface a tube 15, of rectangular external transverse cross-section. The tube 15 is provided at its lower end with a bore 16 which is in axial alignment with the openings 13 and 14, and is counterbored, as at 17, for the reception of a resilient tube 18, preferably made of rubber, the rubber being of a grade capable of withstanding heat without deterioration, for example, silicone rubber.

The tube 18 has an internal diameter substantially the same as the diameter of the bore 16 and openings 13 and 14, so that powder can flow uninterruptedly through the tube and into the chamber 7.

The counterbore 17 is further counterbored, as at 19, this second counterbore being threaded for the connection to the tube 15 of the threaded tubular lower end 20 of a hopper 21, which contains the powder to be melted and sprayed by the torch.

The powder flows, by gravity, from the hopper 21 through the tubular element 20, resilient tube 18, and bore 16 and openings 13 and 14 into chamber 7.

The flow of the combustible mixture through the chamber 7 provides an aspirator action for withdrawing the powder from the chamber 7. Since the flow of powder through the tube 18 depends partly upon gravity and partly upon suction of the aspirator, the flow of powder is proportional to the combustible mixture flow, because the suction of the aspirator depends upon the volume of combustible mixture discharged by the nozzle 6.

For the purpose of shutting off the flow of powder through the tube 18, a plunger 22 having a rounded end 23 is provided. The plunger 22 is slidable in an opening 24 in the rear wall 25 of a tubular housing 26. The housing 26 is threadedly secured in an opening 27 in the rear wall of the tube 15, and is locked to said wall by a locknut 28, which is threaded onto the housing 26.

Figure 2:
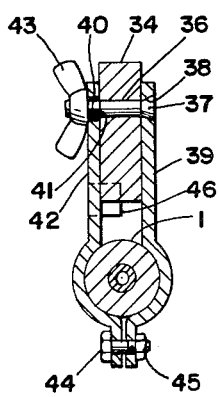
FIG. 2 is a cross-sectional view, taken on the line 2–2 of FIG. 1.

The plunger 22 is normally urged to the position shown in solid lines in FIGS. 1 and 2, by means of a compression coil spring 29, which is interposed between a collar 30, which is threadedly secured within one end of the housing 26, and a collar or flange 31 which is formed integrally with the plunger 22 or brazed or press-fitted to the latter. In this position of the plunger, the collar 31 abuts the wall 25 of the housing 26, and the tube 18 is fully open. The plunger 22, it may be noted, is slidable through an opening 32 in the collar 30.

Means have been provided for fully closing the tube 18 and thereby shutting off the flow of powder through the tube, by moving the plunger 22 to the position shown in broken lines in FIG. 1, and thereby forcing the wall of the tube 18 to the pinched position shown in broken lines in this figure. For this purpose, the plunger 22 is actuated by the cam surface 33 of a handle or lever 34, the cam surface 33 engaging the rounded end 35 at the rear of the plunger.

The handle 34 is mounted for pivotal movement about a pivot pin or bolt 36. The pin or bolt 36 has a tapered head 37, which is disposed in a correspondingly tapered opening 38 in a bracket or clamp member 39, and has a threaded end 40, which extends through an opening 41 in a second bracket or clamp member 42, a wing nut 43 being secured to said threaded end 40.

The clamp members 39 and 42 are rigidly clamped to the body 1 of the torch, as by means of a bolt 44 and nut 45, as best seen in FIG. 2.

When the handle or lever 34 is depressed by the thumb of the operator or welder to the position shown in broken lines in FIG. 1, the cam surface 33 of the handle engages the rounded end 35 of the plunger and moves the plunger to a position in which the flow of powder through the tube 18 is stopped or shut off.

It will be noted that the plunger 22 is located as closely as possible to the chamber 7 in the torch, that is to say, near the lower end of the tube 18, so that when the plunger pinches the tube to shut off the flow of powder, as little powder as possible is left between the shut-off point and the chamber, so that virtually all of the powder below the shut-off point is properly melted.

It will be noted also that the flow of powder through the tube 18 can be regulated or controlled in a desired manner by an experienced welder by merely depressing the handle 34 to any desired position between that shown in solid lines and that shown in broken lines in FIG. 1, and holding the handle in the desired position. This eliminates the need for an adjusting screw, such as the screw 39 in my aforesaid copending application. However, if it is desired that the handle be maintained at any such desired adjusted position, without retaining the thumb on the handle, the handle can be very conveniently locked in any adjusted position by merely tightening the wing nut 43, so that the wing nut and tapered head 37 of the pin 41 coact to produce a frictional lock between the clamp members 39 and 42 and the sides of the handle 34.

It will be noted further that when the handle 34 is released by the operator or welder removing his thumb from the handle, the spring 29 acts to automatically retract the plunger 22 to the position shown in solid lines in FIG. 1, causing the handle 34 to move to the position shown in solid lines in this figure. Movement of the handle beyond this position is stopped by the engagement of the handle with a flange 46 provided on the clamp member 42. When the plunger 22 is thus automatically retracted, the tube 18, in the area of the shut-off, quickly resumes its original cylindrical form, so that there is no possibility of the tube acquiring a "set" during a period when the torch is not in use. The torch may thus be used thereafter, with full assurance that the tube 18 will provide a proper flow of powder.

Since the tube 18 is fully open, when the torch is not in use, it is necessary, in the event that the hopper 21 contains any powder during a period of non-use of the torch, to provide a means for conveniently preventing powder flow into the tube during such period of non-use. For this purpose, a rotary valve 47 is provided, which is mounted in an opening 48 in the tube 15 just above the tube 18, and has an opening 49 extending diametrically therethrough. The valve is locked against displacement axially by means of a split lock washer 50, and is provided with a flat thumb-piece 51.

Figure 3:
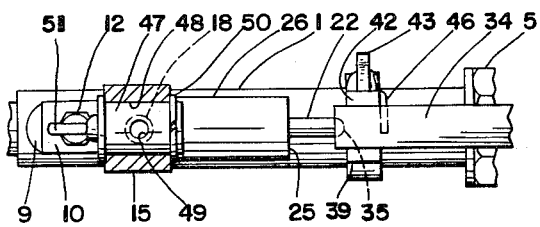
FIG. 3 is a fragmentary cross-sectional view, taken on the line 3–3 of FIG. 1.

When the valve is rotated, by means of the thumb-piece 51, to a position in which the thumb-piece is in a vertical plane, as shown in FIGS. 1 and 3, the opening 49 is in registry or alignment with the rubber tube 18, as in FIGS. 1 and 3, and powder can flow freely from the hopper 21 into the tube 18. When the valve is rotated 90 degrees in either direction from the aforesaid position, the opening 49 is disposed in the position indicated in broken lines in FIG. 1, and powder cannot flow into the tube 18.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a torch for supplying powdered metal or the like through a flame to a work piece: a torch body having a chamber therein and from which a combustible gas mixture is discharged through a tip; an outer tube extending upwardly from the torch body and communicating, through the torch body, with the chamber; a resilient tube within the outer tube and communicating with a source of powder which falls by gravity through the resilient tube directly into said chamber whence it is carried by said combustible mixture to said tip; means including a handle and a plunger independent of said handle and actuated by said handle to pinch said resilient tube to regulate the flow of powder through the resilient tube; and means for mounting said handle on said torch body, said last means including a support extending from said torch body, said handle being pivotally movable with respect to said support; the improvements which comprise:

a valve mounted in said outer tube and adapted to shut off flow of powder from said source into said resilient tube;

means including a spring for automatically retracting said plunger when said handle is released, whereby to permit the pinched area of said resilient tube to regain its cylindrical fully open form or condition; and a cam surface on said handle for actuating said plunger.

2. A torch as defined in claim 1, wherein said support includes a pair of clamp members clamped to said torch body and a pivot pin supported by said clamp members at a higher elevation than the axis of said plunger and about which said handle is pivotally movable; and said torch includes, in addition, means for frictionally locking said clamp members to said handle in any position of adjustment of said handle, and an abutment for limiting the movement of said handle.

References Cited by the Examiner

UNITED STATES PATENTS

| | | | |
|---|---|---|---|
| 2,305,840 | 12/1942 | Brown et al. | 239—85 |
| 2,614,788 | 10/1952 | Woodward | 251—7 |
| 2,660,395 | 11/1953 | Mair et al. | 251—7 |
| 2,786,779 | 3/1957 | Long et al. | 239—85 |
| 2,830,784 | 4/1958 | Placette | 251—263 |
| 2,957,630 | 10/1960 | Lamb | 239—85 |
| 3,172,605 | 3/1965 | Brooks | 239—85 |

FOREIGN PATENTS 812,601   4/1959   Great Britain.

EVERETT W. KIRBY, *Primary Examiner.*

M. HENSON WOOD, JR., *Examiner.*